United States Patent [19]

Breyer

[11] Patent Number: 5,741,002

[45] Date of Patent: Apr. 21, 1998

[54] CONTROL VALVE

[75] Inventor: Karl Breyer, Ingelfingen, Germany

[73] Assignee: Herion-Werke KG, Fellbach, Germany

[21] Appl. No.: 576,153

[22] Filed: Dec. 21, 1995

[51] Int. Cl.$^6$ .................................................. F16K 312/40
[52] U.S. Cl. .......................... 251/30.04; 251/129.04; 137/787.5
[58] Field of Search .................... 251/30.04, 129.04; 137/487.5

[56] References Cited

U.S. PATENT DOCUMENTS

| | | | |
|---|---|---|---|
| 4,746,093 | 5/1988 | Scanderbeg | 251/30.04 |
| 4,799,645 | 1/1989 | Kramer et al. | 251/30.04 |
| 4,995,586 | 2/1991 | Gensberger et al. | 251/129.04 |
| 5,271,599 | 12/1993 | Kolchinsky et al. | 251/30.04 |
| 5,328,148 | 7/1994 | Hartmut | 251/30.04 |

*Primary Examiner*—A. Michael Chambers
*Attorney, Agent, or Firm*—Henry M. Fiereisen

[57] ABSTRACT

A control valve includes a valve body having an inlet port and an outlet port which receives an orifice plate mounted to the valve body. Set within the valve body is a plunger which cooperates with the orifice plate to selectively communicate the inlet port with the outlet port. The plunger is acted upon by a stem for displacement in an axial direction between a closing position and an opening position and provided with a servo system for maintaining the desired position of the plunger. The servo system includes a slide gate which is connected to the stem and opens and closes the fluid passageways between the inlet port, outlet port and a pressurizing chamber above the plunger.

11 Claims, 3 Drawing Sheets

CONTROL VALVE

BACKGROUND OF THE INVENTION

The present invention refers to a control valve, and in particular to a solenoid-operated control valve of a type having a valve body with an inlet port and an outlet port in which an orifice plate is mounted to the valve body for cooperation with a plunger that is displaceable in axial direction by a valve stem.

Control valves of this type are typically used in processing plants, steam power plants and nuclear power plants in which they are subjected to high pressure and high temperature and yet must be completely leak-proof towards the outside.

It is known to provide stem-actuated control valves which are provided with gland packings or bellow seals for effecting a seal towards the outside and are adjustable by pneumatic, oil-hydraulic or electromotive drive mechanisms. Control valves of this type have proven unreliable during operation, especially when regulating a flow of toxic or radioactive fluids because of a risk of leakage that allows these fluids to escape to the outside. Also, at high pressure differentials, damages through erosion and cavitation may be encountered.

It is also known to provide solenoid-operated control valves which include a seat valve as pilot valve. However, as practice has shown, high pressure differentials together with the flow of fluid result in erosion and corrosion along the control edges of the pilot valves. Moreover, the fact that control members of these conventional valves may execute permanent to-and-fro motions is disadvantageous during a continuous operation.

SUMMARY OF THE INVENTION

It is an object of the present invention to provide an improved control valve obviating the aforestated drawbacks.

In particular, it is an object of the present invention to provide an improved control valve by which the number of moving components is significantly reduced and which does not exhibit any projecting parts of the valve stem toward the outside.

It is still another object of the present invention to provide an improved control valve which does not exhibit any inadmissible cyclical adjusting motions of the control members and is of leak-proof configuration to prevent escape of fluid to the outside.

These objects, and others which will become apparent hereinafter, are attained in accordance with the present invention by providing a plunger that is provided with a servo system for adjusting the position of the plunger.

Preferably, the plunger is of hollow configuration to permit incorporation of the servo system.

According to another feature of the present invention, the servo system includes a slide gate which is linked to the stem for selectively communicating a pressurizing chamber disposed above the plunger with the inlet port or the outlet port in order to hydraulically maintain the plunger in balance. The slide gate travels along a flat end face of the plunger and is provided with a recess to selectively connect passageways that are formed in the plunger and extend from the inlet port, the outlet port and the pressurizing chamber above the plunger to terminate at the flat end face. Suitably, the slide gate is spring-biased by rollers in direction towards the flat end face, preferably in a direction transversely to the stem axis.

In the closing position of the control valve, the slide gate of the servo system advantageously communicates the inlet port and the pressurizing chamber above the plunger with one another while the outlet port is sealed off by the slide gate.

According to yet another feature of the present invention, the plunger accommodates in its interior a centering unit in form of two spring plates of T-shaped configuration that circumscribe the stem and bear upon the stem as well as upon the plunger. The spring plates are spring-loaded in axial direction and spaced from one another at a predetermined axial distance which is variable during operation. The centering unit effects a return and a stroke limitation of the servo system and permits to a certain degree a cushioning of moving masses during shutdown of the electric energy supply.

Preferably, the orifice plate is provided in form of a cage which includes axially spaced annular ridges to define annular passages therebetween, and a seat ring to define a separate valve seat for interaction with the plunger.

According to yet another feature of the present invention, the control valve is preferably provided with a noncontacting, e.g. inductive, displacement sensor which measures the displacement of the stem and transmits a corresponding signal to an electronic control unit for further processing.

An advantage of the control valve according to the present invention is the fact that no actuating elements project to the outside, and moreover, the control valve can be sealed from the outside by a single static gasket.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
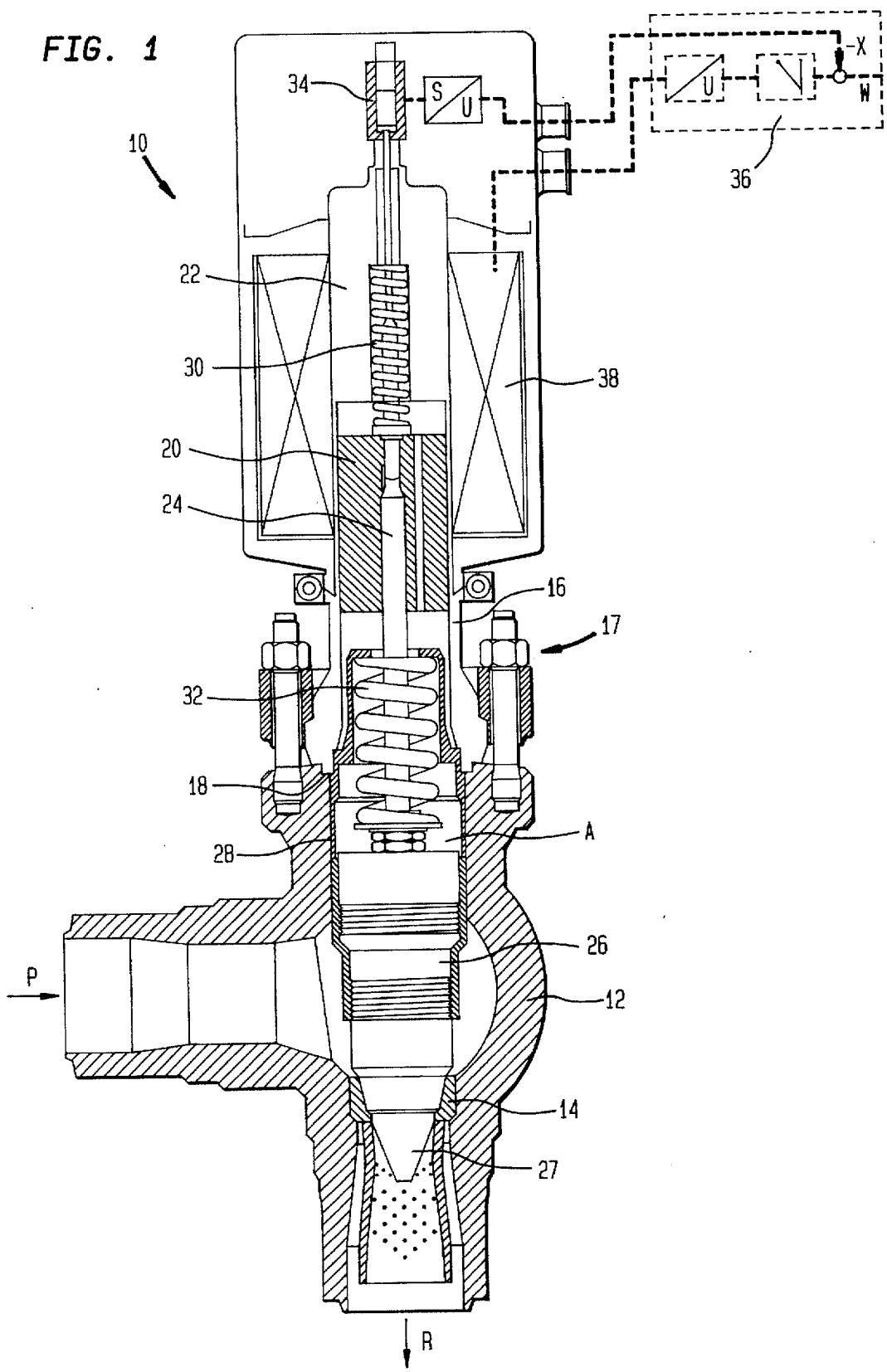
FIG. 1 is a schematic, sectional view of one embodiment of a control valve according to the present invention.

Throughout all the Figures, the same or corresponding elements are generally indicated by the same reference numerals.

Turning now to the drawing, and in particular to FIG. 1, there is shown a schematic, sectional view of one embodiment of a control valve according to the present invention, generally designated by reference numeral 10. The control valve 10 includes a valve body 12 that is formed with a fluid inlet port P and a fluid outlet port R. Held in the outlet port R at the inside wall of the valve body 12 is an orifice plate 14 in form of a hollow, substantially cylindrical cage. A bonnet 16 is securely attached to the valve body 12 by a bonnet bolting in form of flanges, threaded bolts and screws, generally designated by reference numeral 17. Sandwiched between the valve body 12 and the bonnet 16 is a single annular, static gasket 18 for sealing the entire control valve 10 from the outside.

The bonnet 16 accommodates a movable magnetic armature 20, a stationary counterarmature 22 which is securely fixed to the bonnet 16 or may also form a part thereof. The armature 20 is securely fixed to a valve stem 24 which is set vertically within the valve body 12 and is linked to a plunger 26 that is guided within a stationary sleeve 28 for displacement in an axial direction. The plunger 26 has a lower end in form of a wedge 27 for cooperation with the orifice plate 14. The sleeve 18 is securely mounted to the valve body 12, and a pressurizing chamber A is formed in an area above the plunger 26 within the sleeve 28.

Extending within a bore of the stationary counterarmature 22 is an adjustment spring 30 which circumscribes the stem 24. A further adjustment spring 32 extends axially within the sleeve 18 about the stem 24. In the nonlimiting example according to FIG. 1, both adjustment springs 30, 32 are provided in form of helical compression springs which continuously load the stem 24 so that the stem 24 seeks the closing position of the control valve 10.

The bonnet 16 is enveloped in the area of the movable armature 20 and the stationary counterarmature 22 by a ring shaped coil or electromagnet 38 in a manner generally known per se. The plunger-distal end of the bonnet 16 receives the stem 24 or a prolongation thereof and is enveloped by an inductive displacement sensor 34 which detects a motion or displacement of the stem 24 and transmits corresponding signals to an electronic control unit 36.

Figure 2:
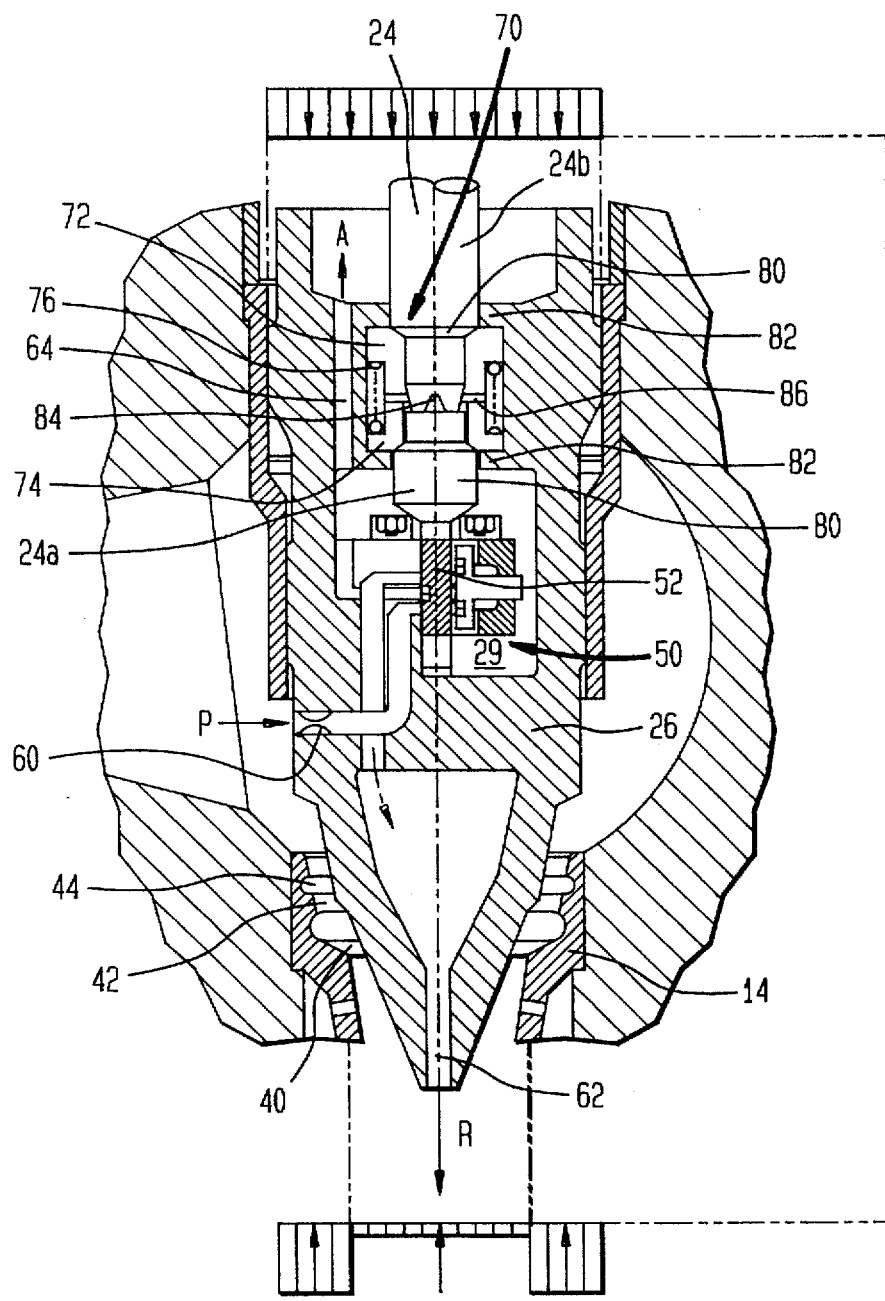
FIG. 2 is a fragmentary sectional view of the control valve of FIG. 1, on an enlarged scale, depicting in detail the plunger with incorporated servo system.

Turning now to FIG. 2, there is shown a sectional view of the plunger 26 of the control valve 10, on an enlarged scale, and it can be seen that the orifice plate 14 is provided in form of a cage which cooperates with the plunger 26 and includes, e.g. two, annular ridges 42 to define annular passages 44 therebetween, and a seat ring 40 to define a separate valve seat. The plunger 26 is substantially hollow in configuration and defines an inside compartment 29 to accommodate a servo system, e.g. a hydraulic servo system, generally designated by reference numeral 50. The servo system 50 includes a slide gate 52 which is securely mounted to the valve stem 24 so as to be prevented from executing any axial displacement relative to the stem 24. Persons skilled in the art will understand that the slide gate 52 may certainly also form an integral part of the valve stem 24.

Figure 3:
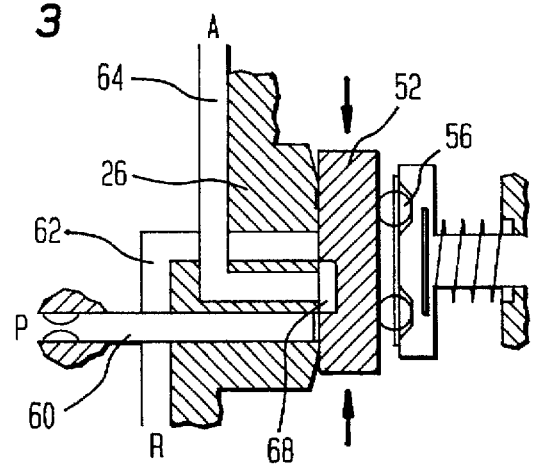
FIG. 3 is an enlarged, fragmentary sectional view of the servo system, showing the slide gate occupying its controlled position.

The plunger 26 exhibits a flat end face 54 which is in registry with the slide gate 52 that is pushed against the end face 54 by rollers 56, as shown e.g. in FIG. 3. The rollers 56 are continuously loaded by a compression spring 58 which, although not shown in the drawing in detail, is preferably of adjustable configuration. Terminating in the end face 54 are passages 60, 62, 64 which are formed in the plunger 26, with passage 60 communicating with the inlet port P, passage 62 communicating with the outlet port R, and passage 64 communicating with the pressurizing chamber A above the plunger 26. Suitably, a throttle valve 66 is incorporated in the passage 60 that communicates with the inlet port P.

As shown e.g. in FIG. 3, the surface of the slide gate 52 in registry with the flat end face 54 of the plunger 26 is formed with a recess 68 to allow a selective communication of individual passages 60, 62, 64 with one another, as will be described hereinbelow.

The stem 24 is of split configuration and is formed with a lower stem section 24a which incorporates the slide gate 52 and is connected to an upper stem section 24b via a coupling 84. In the area of the coupling 84, the stem sections 24a, 24b are of reduced diameter to accommodate a centering unit 70 which is installed between the valve stem 24 and the plunger 26. The centering unit 70 includes two spring plates 72, 74 of T-shaped configuration and in spaced apart relationship in axial direction to define a distance 86 therebetween. The spring plates 72, 74 are biased in axial direction continuously by a helical compression spring 76 that extends between the spring plates 72, 74 to keep them at a distance 86 and envelope the valve stem 24 such that their end faces bear upon shoulders 80 of the valve stem 24 as well as upon collars 82 projecting integrally from the plunger 26.

The operation of the control valve 10 to regulate a fluid flow from the inlet port P to the outlet port R is as follows:

Upon deenergized electromagnet 30, the adjustment springs 30, 32 urge the valve stem 24 and thus the interconnected plunger 26 onto the valve seat 40 of the orifice plate 14 to cut the fluid flow from the inlet port P to the outlet port R. This represents the closed position of the control valve 10.

When the electromagnet 38 is energized in a preselected manner, the armature 20 moves upwards to unseat the plunger 26 from the valve seat 40. The plunger 26 occupies a preset position in which the control valve 10 is open to allow a flow of fluid from the inlet port P to the outlet port R and which represents the controlled variable being maintained by the servo system 50. This preset position of the control valve is shown in FIGS. 2 and 3 and detected by the displacement sensor 34 which sends a corresponding actual value signal for input into the electronic control unit 36. The control unit 36 compares the actual value with a stored desired value and depending on the comparison executes required corrections.

As best seen in FIG. 3, in the opening position of the control valve 10, the slide gate 52 of the servo system 50 is disposed in its normal position being controlled, with the recess 68 occupying a position in which the passage 64 from the pressurizing chamber A inside the plunger 26 neither communicates with the inlet port P via passage 60 nor with the outlet port R via passage 62 (zero covering of the pressurizing chamber A with the inlet port P and outlet port R).

Figure 4:
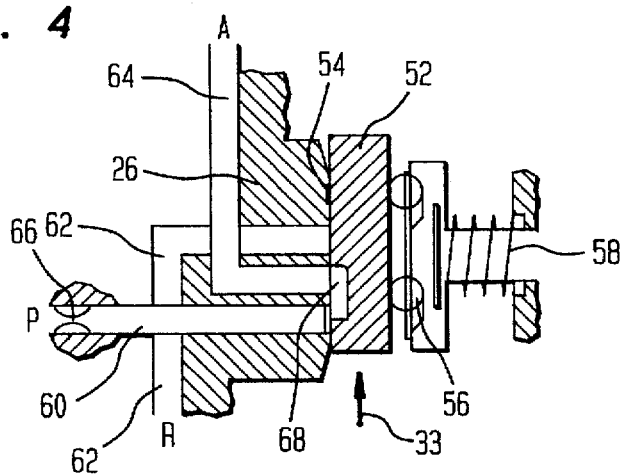
FIG. 4 is an enlarged, fragmentary sectional view of the servo system, showing a shift of the slide gate from its controlled position in opening direction of the control valve.

When the slide gate 52 is shifted by the valve stem 24 in opening direction of the control valve 10 as indicated by arrow 33 in FIG. 4, the recess 68 of the slide gate 52 occupies a position in which the passage 64 communicates with the passage 62 so that the pressurizing chamber A above the plunger 26 is connected to the outlet port R. Thus, pressure in the pressurizing chamber A is released so that the plunger 26 moves upwards until the servo system 50 occupies again the controlled position shown in FIG. 3 to balance the plunger 26.

Figure 5:
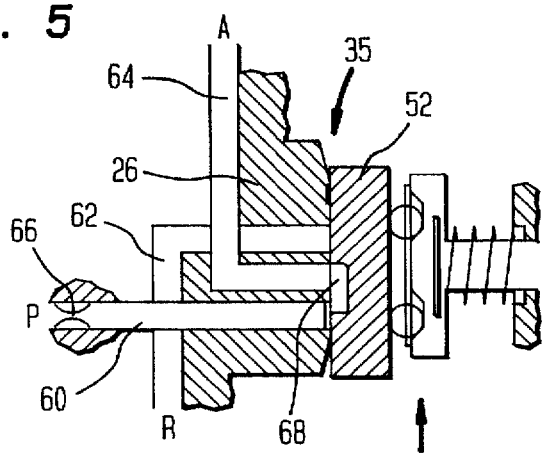
FIG. 5 is an enlarged, fragmentary sectional view of the servo system, showing a shift of the slide gate from its controlled position in closing direction of the control valve.

In case the slide gate 52 shifts in closing direction of the control valve 10, as indicated by arrow 35 in FIG. 5, the passage 64 is immediately connected to the passage 60 so that the upper pressurizing chamber A communicates with the inlet port P, thereby building up pressure in the pressurizing chamber A. Thus, the plunger 26 moves in closing direction of the control valve 10 until the controlled position according to FIG. 3 is reached again.

The controlled position of FIG. 3 is maintained by the servo system 50 also in those circumstances in which impacting flow forces alter the position of the plunger 26 relative to the slide gate 52.

In the event, the plunger 26 deviates, e.g. in opening direction, from its predetermined lift position, the pressure in the chamber A increases as the inlet port P communicates with the chamber A. On the other hand, if the plunger 26 deviates from its predetermined lift position in closing direction of the control valve 10, the pressure in the chamber A decreases as the chamber A communicates with the outlet port R. Thus, the servo system 50 maintains the plunger 26 in each such case in balance.

The maximum lift of the slide gate 52, i.e. the maximum relative movement between the plunger 26 and the slide gate 52 is limited in both cases by the axial distance 86 between both spring plates 72, 74.

In case the control valve 10 should be closed, the electromagnet 38 is deenergized or deenergized to such an extent that its magnetic force is lower than the force exerted by both adjustment springs 30, 32. Thus, both adjustment springs 30, 32 push the plunger 26 via the stem 24, the spring plate 72, the spring 76 and the spring plate 74 in closing direction in which the plunger 26 rests in fluid-tight manner on the valve seat 40 of the orifice plate 14.

Once the plunger 26 rests upon the valve seat 40, the stem 24 continues to move in closing direction until the spring plate 72 covers the axial distance 86 and bears upon the spring plate 74. The slide gate 52 which is securely mounted to the stem 24 thus shifts relative to the plunger 26 into the position shown in FIG. 5. The pressurizing chamber A above the plunger 26 is acted upon by the full feed pressure from the inlet port P via the passage 60, the recess 68 in the slide gate 52 and the passage 64 so that the plunger 26 is pushed by the full operational pressure differential onto the valve seat 40. The passage 62 formed in the plunger 26 and communicating with the outlet port R is effectively sealed in a leak-proof manner by the slide gate 52, as shown in FIG. 5. During return of the plunger 26 into the closed position, the force of the compression spring 76 extending between both spring plates 72, 74 is overcome by the adjustment springs 30, 32.

As described above, the inlet to the orifice plate 14 is formed with annular ridges 42 and annular passages 44 therebetween. The ridges 42 and the annular passages 44 effect e.g. during expansion of subcooled water a pre-evaporation which creates in the constriction formed by the throttle valve 66 a complete evaporation so as to prevent fluid from impingement at high velocity and thus to protect the throttle valve from damage or destruction.

While the invention has been illustrated and described as embodied in a control valve, it is not intended to be limited to the details shown since various modifications and structural changes may be made without departing in any way from the spirit of the present invention.

What is claimed as new and desired to be protected by Letters Patent is set forth in the appended claims:

I claim:

1. A solenoid-operated control valve; comprising:
   a valve body having an inlet port and an outlet port;
   a plunger set within the valve body and being operatively connected to a stem for displacement in an axial direction, said valve body and said plunger defining a pressurizing chamber at a location above the plunger; and
   a servo system including a slide gate linked to the stem for selectively connecting the pressurizing chamber to only one of the inlet port and the outlet port to thereby automatically maintain a desired position of the plunger.

2. The control valve of claim 1 wherein the plunger is of hollow configuration, said servo system being incorporated within the hollow plunger.

3. The control valve of claim 1 wherein the plunger has a flat end face in registry with the slide gate and is formed with fluid passageways for communication with the inlet port, the outlet port and the pressurizing chamber, said fluid passageways terminating in the flat end face.

4. The control valve of claim 3 and further comprising spring-biased rollers received in the plunger for loading the slide gate in direction of the flat end face.

5. The control valve of claim 3 wherein the stem defines an axis, said slide gate being pressed against the flat end face transversely to the axis of the stem.

6. The control valve of claim 3 wherein a slide gate connects in the closing position of the plunger the fluid passageway from the inlet port to the pressurizing chamber and cuts the fluid passageway to the outlet port.

7. The control valve of claim 1, and further comprising a centering unit incorporated within the plunger, said centering unit including two spring plates circumscribing the stem and spring-loaded in axial direction, said spring plates defining a variable axial distance from one another.

8. The control valve of claim 7 wherein the spring plates bear in axial direction upon the stem as well as upon the plunger.

9. The control valve of claim 1, and further comprising an orifice plate mounted to the valve body within the outlet port, said orifice plate being formed with axially spaced annular ridges forming annular passages therebetween, and with a seat ring for defining a separate valve seat.

10. The control valve of claim 1, and further comprising a noncontacting inductive displacement sensor for measuring the displacement of the stem.

11. The control valve of claim 10, and further comprising an electronic control unit operatively connected to the stem for receiving a signal from the displacement sensor commensurate with a position of the plunger.

\* \* \* \* \*